(12) United States Patent
McMahon

(10) Patent No.: US 12,397,898 B2
(45) Date of Patent: Aug. 26, 2025

(54) AIRCRAFT ACCESS COVER

(71) Applicant: Airbus Operations Limited, Bristol (GB)

(72) Inventor: Andrew McMahon, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/387,948

(22) Filed: Nov. 8, 2023

(65) Prior Publication Data

US 2024/0158066 A1 May 16, 2024

(30) Foreign Application Priority Data

Nov. 14, 2022 (GB) ...................................... 2216970

(51) Int. Cl.
*B64C 1/14* (2006.01)
*B64D 37/06* (2006.01)

(52) U.S. Cl.
CPC ................ *B64C 1/14* (2013.01); *B64D 37/06* (2013.01)

(58) Field of Classification Search
CPC ......... B64C 1/14; B64C 1/1446; B64D 37/06; B64D 29/08; B64D 37/005; B64D 37/00; B64D 37/02; B64D 37/04; B64F 5/10
See application file for complete search history.

(56) References Cited

U.S. PATENT DOCUMENTS

| | | | |
|---|---|---|---|
| 2,528,600 A * | 11/1950 | Lombard | B64D 37/005 |
| | | | 137/202 |
| 2,597,576 A | 5/1952 | Donovan | |
| 3,980,111 A | 9/1976 | Badger | |
| 4,579,248 A | 4/1986 | Gorges | |
| 4,734,016 A | 3/1988 | Sailer | |
| 4,848,034 A * | 7/1989 | Pace | B64D 37/08 |
| | | | 292/254 |

(Continued)

FOREIGN PATENT DOCUMENTS

| CN | 107200140 A | 9/2017 |
|---|---|---|
| CN | 207328804 | 5/2018 |

(Continued)

OTHER PUBLICATIONS

British Search Report for Application No. 2216970 dated Apr. 19, 2023.

(Continued)

*Primary Examiner* — Joshua D Huson
*Assistant Examiner* — Vicente Rodriguez
(74) *Attorney, Agent, or Firm* — KDW Firm PLLC

(57) ABSTRACT

An aircraft access cover for an opening in the surface of an aircraft. The aircraft access cover includes a first panel and a second panel, the first panel and second panel configured to be attachable to each other such that the surface of the aircraft is clampable between the first panel and second panel when the first panel and the second panel are attached to each other. A device that is operable to perform a function while attached to the aircraft access cover is attachable by a connector to the first panel of the aircraft access cover, the connector allowing the device to be movable between a first orientation relative to the first panel and a second orientation relative to the first panel.

16 Claims, 6 Drawing Sheets

(56) References Cited

U.S. PATENT DOCUMENTS

| | | | |
|---|---|---|---|
| 8,113,467 B2* | 2/2012 | Sandiford | B64D 37/005 |
| | | | 244/135 C |
| 9,296,467 B1 | 3/2016 | Hollibaugh | |
| 9,315,276 B2* | 4/2016 | Alazraki | B64C 1/14 |
| 2008/0295905 A1 | 12/2008 | Sandiford | |
| 2009/0145517 A1 | 6/2009 | Cardozo | |
| 2009/0294591 A1* | 12/2009 | Ramirez Blanco | B64C 3/34 |
| | | | 244/129.4 |
| 2018/0251366 A1 | 9/2018 | Dahm | |
| 2019/0300142 A1 | 10/2019 | Helsley | |

FOREIGN PATENT DOCUMENTS

| | | |
|---|---|---|
| CN | 211308990 | 8/2020 |
| EP | 2664547 A1 | 11/2013 |

OTHER PUBLICATIONS

European Search Report for Application No. 23209060 dated Mar. 28, 2024.
European Office Action in EP Application No. 23209060.5 dated May 27, 2025, 6 pages.

\* cited by examiner

AIRCRAFT ACCESS COVER

TECHNICAL FIELD

The disclosure herein relates to aircraft access covers for aircraft systems, and methods of assembling aircraft systems comprising aircraft access covers.

BACKGROUND

Aircraft access covers located in the surface of an aircraft system or structure provide access to, for example, fuel tanks located in the wings of an aircraft for a number of reasons, ranging from fuel systems installation at manufacture to performing maintenance or repair tasks. Due to limited space inside the aircraft system, devices operable within the aircraft system, for example overpressure protectors for fuel tanks, are often mounted to aircraft access covers. Such devices are often provided on single-piece bolted access panels. Single-piece bolted access panels can require holes to be drilled into the surface of the aircraft in order to secure the access panel to the surface of the aircraft. Such holes act as stress raisers in the surface of the aircraft. This can mean the aircraft surface must be reinforced to accommodate the additional stresses, increasing the weight of the aircraft system or structure.

It is desirable to provide an improved aircraft access cover which can enable aircraft systems to house operable devices while mitigating this problem.

SUMMARY

A first aspect of the disclosure herein provides an aircraft access cover for blocking an opening in a surface of an aircraft, the aircraft access cover comprising a first panel and a second panel that are configured to be attachable to each other such that the surface of the aircraft is clampable between the first panel and the second panel when the first panel and the second panel are attached to each other. The first panel comprises a connector for attaching a device to the first panel in a movable manner such that the device, when attached to the first panel by the connector, is movable between a first orientation relative to the first panel and a second orientation relative to the first panel.

The aircraft access cover, having such a connector, can house a device in a reconfigurable manner, such that the aircraft access cover and attached device have a first spatial footprint when the attached device is in the first orientation and a second spatial footprint when the attached device is in the second orientation. Such a reconfigurable spatial footprint may be more easily or more safely installed, or removed. For example, the aircraft access cover may be passed through the opening of the surface when the attached device is in the first orientation, and the aircraft access cover may be clamped to the surface when the attached device is in the second orientation.

Optionally, the connector comprises at least a portion of a hinge or pivot mechanism. In some examples, the connector comprises a first portion of the hinge or pivot mechanism and the attachable device comprises a second, remaining portion of the hinge or pivot mechanism, the first portion and second portion of the hinge or pivot mechanism forming a complete hinge or pivot mechanism in combination. In other examples, the connector comprises a complete hinge or pivot mechanism, such that the device to be attached to the aircraft access cover need not comprise a connector.

Optionally, the aircraft access cover comprises a retainer, the retainer being configured such that the device, when attached to the first panel by the connector, is retainable by the retainer in at least one of the first orientation and the second orientation. This can reduce unwanted motion of the device relative to the first panel during, for example, maneuvering of the panel and device during installation, which can reduce risk of collision of the device and/or access cover with surrounding structures. In some examples, the retainer comprises one or more of a latch, fastener, and a magnet. In some examples, the retainer is configured to retain the device in the first orientation.

Optionally, the first panel comprises an aperture, the aperture aligned to interface with the device when the device is attached and in the second orientation relative to the first panel. This can allow the device to be manipulated between orientations by a manipulator located on the other side of the panel to the device.

Optionally, the aircraft access cover comprises a reorienting mechanism, the reorienting mechanism operable to move the device, when attached to the first panel by the connector, between the first orientation and the second orientation. In some examples, the reorienting mechanism allows the device to be reoriented without being physically accessible from, for example, outside of an aircraft structure which the aircraft access cover is installed in. In some examples the reorienting mechanism is a sprung hinge or a remotely-controllable motor.

A second aspect of the disclosure herein provides aircraft fuel tank equipment for an aircraft fuel tank, the aircraft fuel tank equipment comprising a connector whereby the aircraft fuel tank equipment is attachable in a movable manner to an aircraft access cover for blocking an opening in a surface of an aircraft, such that when the aircraft fuel tank equipment is attached to the aircraft access cover by the connector, the aircraft fuel tank equipment is movable between a first orientation relative to the aircraft access cover and a second orientation relative to the aircraft access cover.

The aircraft fuel tank equipment, comprising such a connector, is attachable to the aircraft access cover in a movable manner, such that when attached to the aircraft access cover, the attached device and aircraft access cover have a reconfigurable spatial footprint. This can improve the ease of installation of the device and access panel into an aircraft system or structure, or removal thereof therefrom.

Optionally, the connector comprises at least a portion of a hinge or pivot mechanism. In some examples, the connector comprises a first portion of the hinge or pivot mechanism and the aircraft access cover comprises a second, remaining portion of the hinge or pivot mechanism, the first portion and second portion of the hinge or pivot mechanism forming a complete hinge or pivot mechanism in combination. In other examples, the connector comprises a complete hinge or pivot mechanism, such that the aircraft access cover which the device is attachable to by the connector need not comprise a connector.

Optionally, the aircraft fuel tank equipment comprises a retainer, the retainer being configured such that, when the aircraft fuel tank equipment is attached to the aircraft access cover by the connector, the aircraft fuel tank equipment can be retained in at least one of the first orientation and the second orientation. Optionally, the retainer comprises one or more of a latch, a fastener, and a magnet.

Optionally, the aircraft fuel tank equipment comprises at least one of an overpressure protector, a magnetic level sensor, and a NACA duct.

A third aspect of the disclosure herein provides an aircraft system, comprising: an aircraft access cover for blocking an opening in a surface of an aircraft, the aircraft access cover comprising a first panel and a second panel that are configured to be attachable to each other such that the surface of the aircraft is clampable between the first panel and the second panel when the first panel and the second panel are attached to each other; a device that is operable to perform a function while attached to the aircraft access cover; and a connector by which the device and the first panel are movably attached or movably attachable to each other, such that, when the device and the first panel are attached to each other, the device is movable between a first orientation relative to the first panel and a second orientation relative to the first panel.

Optionally, the connector comprises a hinge or pivot mechanism. In some examples, the device comprises the connector. In other examples, the first panel of the aircraft access panel comprises the connector. In further examples still, the device comprises a first portion of the connector and the first panel comprises a second portion of the connector, the first portion and the second portion of the connector forming a complete connector.

Optionally, the first orientation is substantially 90-degrees rotated from the second orientation relative to the connector. In such examples, the system can have a substantially different spatial footprint in the first orientation to the second orientation. In other examples, the first orientation may be at least 60 degrees rotated from the second orientation relative to the connector. In other examples still, the first orientation may be at least 45 degrees rotated from the second orientation.

Optionally, the device, when attached to the first panel of the aircraft access cover: protrudes from the aircraft access cover by a first distance when in the first orientation relative to the aircraft access cover, and protrudes from the aircraft access cover by a second distance when in the second orientation relative to the aircraft access cover, wherein the first distance is less than the second distance.

Optionally, the first panel comprises an aperture.

Optionally, the attached device interfaces with the aperture when in the second orientation. Optionally, at least one of the device or first panel comprises a seal positioned between the device and the first panel when the device is in the second orientation, thereby to seal a path fluidically connecting the device and the aperture.

Optionally, when the first panel comprises an aperture and the device interfaces with the aperture when in the second orientation, the device comprises an overpressure protector.

Optionally, the device comprises a magnetic level sensor or a NACA duct.

Optionally, the system comprises a retainer, the retainer configured such that the device, when attached to the first panel by the connector, is retainable by the retainer in at least one of the first orientation and the second orientation. Optionally, the retainer is a fastener, and the device is retained in the second orientation by the fastener.

In some examples, the aircraft access cover of the aircraft system is the aircraft access cover of the first aspect. In some examples, the device of the aircraft system comprises the aircraft fuel tank equipment of the second aspect.

Optionally, the system comprises the surface.

Optionally, when the system comprises the surface, the aircraft access cover and the device are maneuverable through the opening of the surface when the device is attached to the aircraft access cover and in the first orientation relative to the aircraft access cover, and the system is non-maneuverable through the opening of the surface when the device is attached to the aircraft access cover and in the second orientation relative to the aircraft access cover.

Optionally, the aircraft system is a wing structure. Optionally, the wing structure comprises a fuel tank.

In a fourth aspect of the disclosure herein, there is provided an aircraft comprising the aircraft system of the third aspect.

In a fifth aspect of the disclosure herein, there is provided a method for assembling an aircraft system, the method comprising: providing a first panel of an access cover, the first panel having a device attached thereto and arranged in a first orientation relative to the first panel; maneuvering, through an opening in a surface of an aircraft, the first panel with the device attached thereto and oriented in the first orientation; positioning the first panel with the device attached into a clamping position relative to the opening of the surface of the aircraft; reorienting the device from the first orientation to a second orientation relative to the first panel; and attaching the first panel to a second panel, thereby clamping the surface of the aircraft between the first and second panels.

Optional features of aspects of the disclosure herein may be applied equally to other aspects of the disclosure herein, where appropriate.

BRIEF DESCRIPTION OF THE DRAWINGS

Embodiments of the disclosure herein will now be described, by way of example only, with reference to the accompanying drawings, in which.

DETAILED DESCRIPTION

Figure 1A:
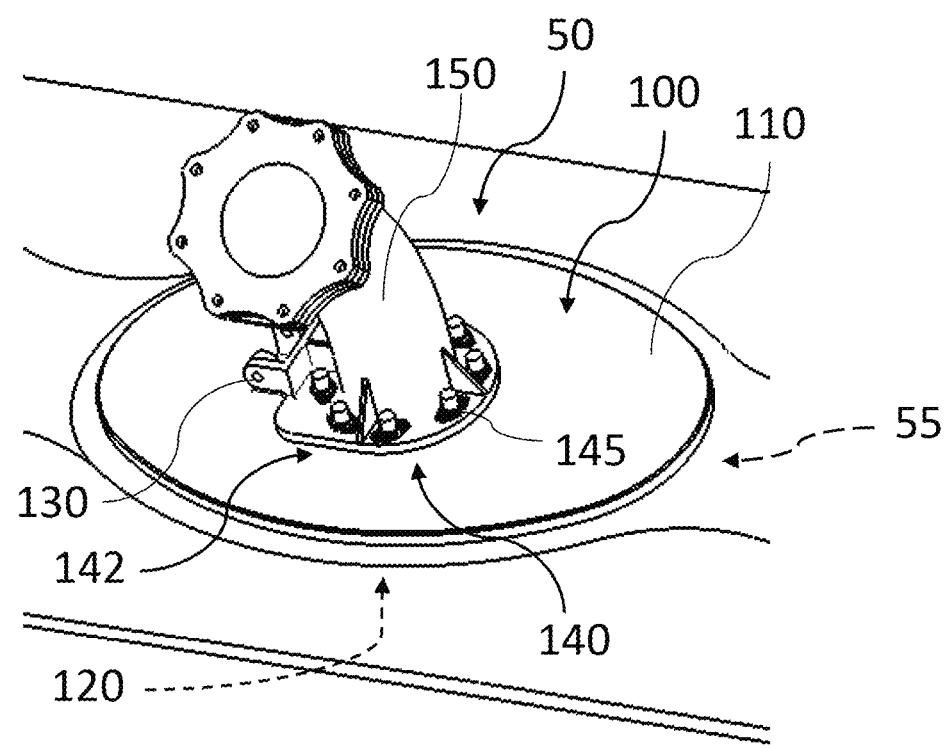
FIGS. 1a and 1b show schematic perspective views of an aircraft system according to an embodiment of the disclosure herein.

FIG. 1a shows an aircraft system comprising an aircraft access cover 100 blocking an opening 55 in a surface 50 of an aircraft. In this example, the surface 50 is the surface of a wing structure housing a fuel tank. The Figure shows the interior surface of the wing structure. The access cover 100 is removable from the opening 55 of the surface 50 to permit access through the opening 55 to the fuel tank for, for example, maintenance of the fuel tank.

The aircraft access cover 100 comprises a first panel 110 and a second panel (120, not visible in FIG. 1a but position indicated by dashed arrow) which are attached to each other and clamp the surface 50 between them. The clamping configuration is shown in more detail in FIG. 2. An overpressure protector 150, as an example of an aircraft fuel tank equipment, is movably attached to the first panel 110 of the aircraft access cover 100 by a connector 130.

Figure 1B:
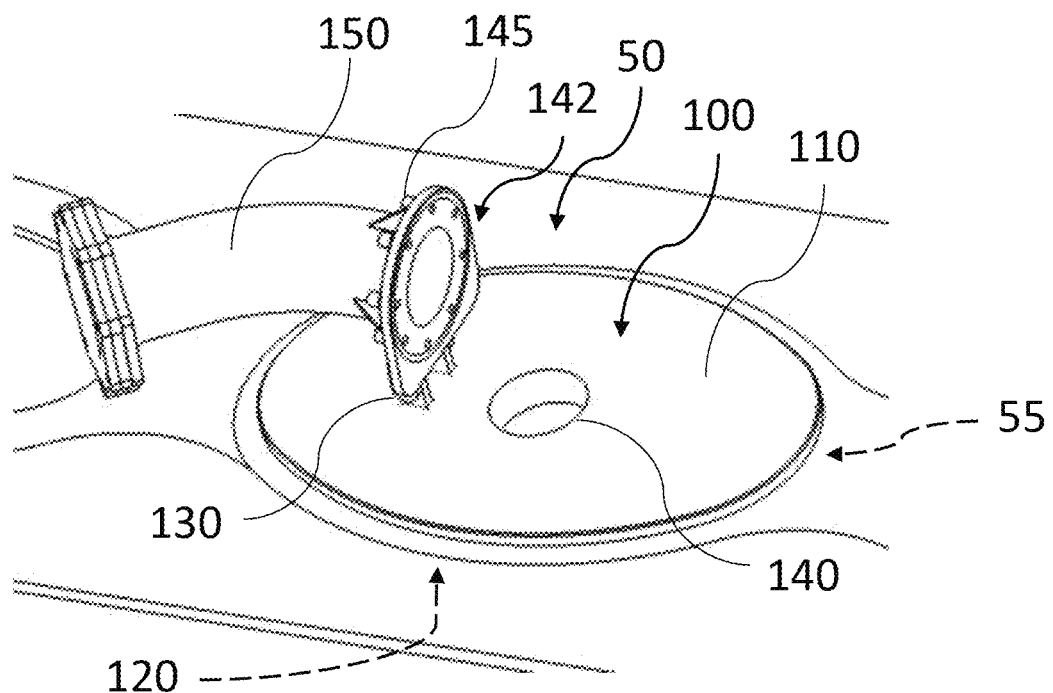

The overpressure protector 150, being movably attached to the first panel 110 by the connector 130, can be reoriented relative to the first panel 110 by rotation about the connector 130. FIG. 1b shows the system of FIG. 1a, wherein the overpressure protector 150 is oriented in a first orientation relative to the first panel 110. In FIG. 1a, the overpressure protector 150 is oriented in a second orientation relative to the first panel 110. The first orientation of the overpressure protector 150 relative to the first panel 110 is a 90-degree rotation about the connector 130 from the second orientation of the overpressure protector 150 relative to the first panel 110. In the first orientation of the overpressure protector 150 relative to the first panel 110, the overpressure protector 150 can be considered to extend parallel to the surface of the first panel 110, protruding by a first distance away from the surface of the first panel 110, and in the second orientation of the overpressure protector 150 relative to the first panel 110, the overpressure protector 150 can be considered to extend perpendicular to the surface of the first panel 110, protruding by a second distance away from the surface of the first panel 110. The second distance is longer than the first distance, or in other words, the attached overpressure protector 150 protrudes more from the surface of the first panel 110 when in the second orientation than in the first orientation.

The connector 130 is, in this example, a hinge mechanism. The connector 130 comprises a first portion provided on the first panel 110, and a second portion provided on the overpressure protector 150, the first portion and the second portion being attached to each other when the overpressure protector 150 is connected to the first panel 110.

The first panel 110 comprises an aperture 140. The second panel 120 comprises an aperture (141, not pictured) which, when the first panel 110 and second panel 120 are attached to each other such that the access cover 100 blocks the opening 55 of the surface, is aligned to overlie the aperture 140 of the first panel 110. The aperture 140 may permit the overpressure protector 150 to be reoriented by, for example, a user located on the opposite side of the first panel 110 to the device, placing a hand through the aperture 140 and manipulating the overpressure protector 150. Other ways of physically manipulating the overpressure protector 150 may utilize the aperture 140 in a similar fashion.

The overpressure protector 150 comprises a fastener 145 and a seal 142. The fastener 145 is operable to retain the overpressure protector 150 in the second orientation relative to the first panel 110, by fastening the overpressure protector 150 to the first panel 110. When in the second orientation relative to the first panel 110, the overpressure protector 150 interfaces with the aperture 140 of the first panel 110. The seal 142 is positioned between overpressure protector 150 and the first panel 110 to fluidically seal a path between the overpressure protector 150 and the aperture 140, when the overpressure protector 150 is in the second orientation. The fastener 145 is operable to help maintain the seal. The seal prevents fuel stored in the fuel tank from leaking through the apertures 140, 141 in a way which bypasses the overpressure protector 150.

The overpressure protector 150 is operable, when in the second orientation relative to the first panel 110, to release excess pressure from within the fuel tank to the external environment through the aircraft access cover apertures 140, 141.

Figure 2:
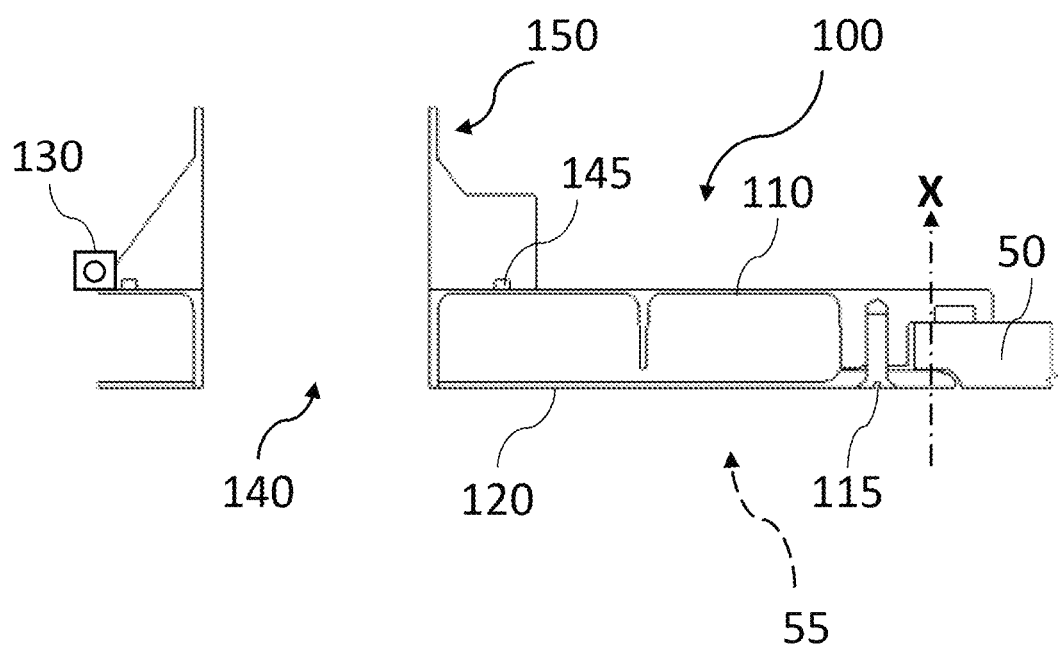
FIG. 2 shows a schematic cross-sectional view of the aircraft system of FIGS. 1a and 1b.

FIG. 2 shows a schematic cross-sectional view of the system of FIG. 1a. The first panel 110 is attached to the second panel 120 by a fastener 115. The first panel 110 engages a first side of the surface 50 and the second panel 120 engages a second side of the surface 50, the second side of the surface 50 opposite to the first side of the surface 50 such that the surface 50 is located between the first panel 110 and the second panel 120, as can be seen with respect to the indicative axis X. The first panel 110 and second panel 120 therefore each overlap the surface 50 such that when the first panel 110 and the second panel 120 are attached to each other by the fastener 115, the surface 50 is clamped between the first panel 110 and the second panel 120. In this way, the access cover 100 blocks the opening 55 of the surface 50 and is secured to the surface 50, but does not require direct fastening to the surface 50.

Figure 3A:
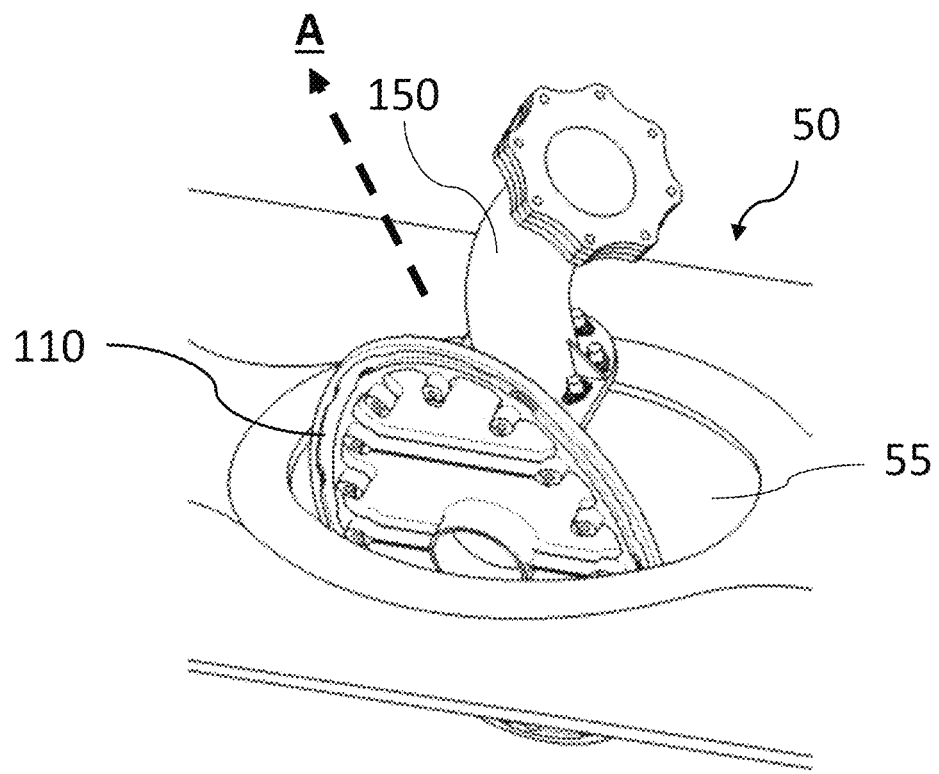
FIGS. 3a and 3b show schematic perspective views of the aircraft access cover of FIGS. 1a and 1b being installed in the surface of an aircraft.

FIG. 3a illustrates the first panel 110 and attached overpressure protector 150 being maneuvered through the opening 55 of the surface 50 during an installation process. During installation of the access cover 100, the first panel 110 is maneuvered through the opening 55 of the surface 50 so that the first panel 110 can engage the first side of the surface 50. The second panel 120 is then attached to the first panel 110 from the second side of the surface 50 to arrive at the configuration illustrated in FIG. 2.

The overpressure protector 150 is oriented in the first orientation relative to the first panel 110. In the first orientation, the overpressure protector 150 and the first panel 110 are maneuverable through the opening 55 of the surface 50, as illustrated by indicative direction arrow A. The spatial footprint of the overpressure protector 150 and the first panel 110, when the overpressure protector 150 is in the first orientation relative to the first panel 110, is therefore appropriately sized, or in other words small enough, to pass through the opening 55 in the surface 50.

Figure 3B:
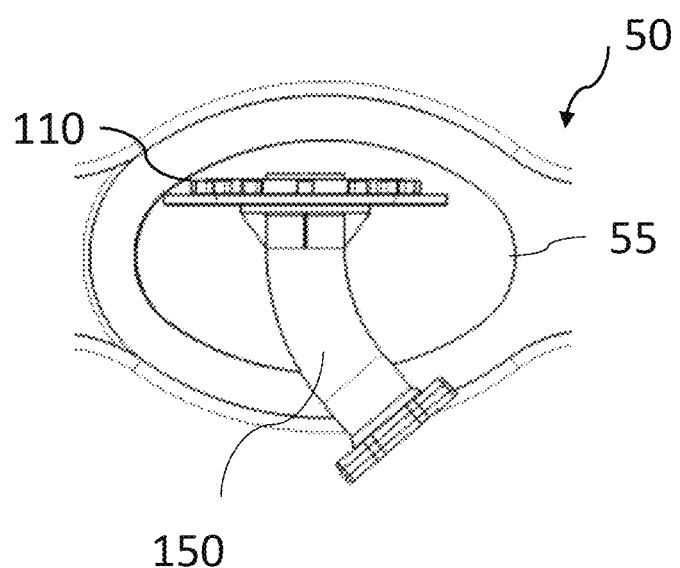

FIG. 3b illustrates the overpressure protector 150 and the first panel 110 positioned next to the opening 55 of the surface 50 when the overpressure protector 150 is in the second orientation relative to the first panel 110. As depicted by FIG. 3b, the spatial footprint of the overpressure protector 150 and the first panel 110, when the overpressure protector 150 is in the second orientation relative to the first panel 110, is inappropriately sized, or in other words too large, to pass through the opening 55 in the surface 50.

The overpressure protector 150 is operable to perform the function of managing pressure within the fuel tank when the overpressure protector 150 is in the second orientation relative to the first panel 110. The overpressure protector 150 can be reoriented to the first orientation relative to the first panel 110, such that the first panel 110 and the attached overpressure protector 150 can be maneuvered through the opening 55 of the surface 50 as discussed above.

The above embodiment is to be understood as an illustrative example of the disclosure herein. Further embodiments of the disclosure herein are envisaged:

In the example of FIGS. 1 to 3 the access cover 100 covers an opening 55 in a surface 50 which is the surface of a wing structure housing a fuel tank. In other examples, other aircraft systems or aircraft structures may comprise the access cover 100 with the attached device 150 described herein. For example, the access cover 100 may be located in the fuselage, and may provide access to an area of the fuselage inaccessible from inside the aircraft, such as the tail cone. In other examples, the access cover 100 may be located in the fuselage and may provide access to a fuselage fuel tank. In further examples, the wing structure is a horizontal tailplane fuel tank, such as a trim tank.

In the example of FIGS. 1 to 3 an overpressure protector 150 is movably attached to the first panel 110 of the access cover 100. In other examples, devices other than the overpressure protector 150 and operable with an aircraft structure may be additionally or alternatively provided. For example, the device 150 attached to the access cover 110 may instead be a magnetic level sensor, to monitor an amount of fuel in the fuel tank. In other examples, the device 150 may be an air inlet system such as a NACA duct. In further examples, the device 150 may be a floatstick. In yet further examples, the device 150 may be one or more flight test instrumentation sensors and/or cameras.

In some examples, a plurality of devices may be attached to the first panel 110, wherein the plurality may comprise different devices, and/or may comprise more than one of a particular device. In such examples, the plurality of devices may be reoriented from respective first orientations, suitable to pass the first panel and devices through an opening, to respective second orientations, in which the devices are operable. Each device of the plurality of devices may be movably attached to the first panel by a respective connector such that each device of the plurality of devices is independently reorientable, or the plurality of devices may be attached to a common connector such that the devices are collectively reorientable concurrently.

In the example of FIGS. 1 to 3, the overpressure protector 150 is operable in the second orientation relative to the first panel, such that the overpressure protector 150 has interfaced with the aperture 140 and formed a seal. In examples where other devices or another device are provided, such devices may be operable in other orientations relative to the first panel, and may not seal with the aperture 140. In some examples, a seal element may not be used.

Furthermore, the first panel and second panel may not both comprise an aperture each, for example where the device 150 does not utilize a path to the external environment. In some examples, only the first panel comprises an aperture, the aperture being used for, for example, reorientation of the attached device, and the second panel does not comprise an aperture. In some examples, neither the first panel 110 nor the second panel 120 comprises an aperture.

In the examples of FIGS. 1 to 3, the connector 130 is a hinge mechanism. In other examples, other mechanisms suitable for movably attaching the device 150 to the first panel 110 may be used. The connector 130 may, for example, permit both translation and rotation of the attached device 150 relative to the first panel 110. The connector 130 may be primarily, or in some examples completely, mounted on the first panel 110, and in other examples the connector 130 may be primarily, or in some examples completely, mounted on the device 150.

In the examples of FIGS. 1 to 3, the first orientation of the overpressure protector 150 relative to the first panel 110 is substantially 90-degrees rotated from the second orientation, the rotation relative to the connector. In other examples, for example where different connector mechanisms are used, the first orientation may be more or less rotated or otherwise different from the second orientation. In some examples, limiting the range of motion of the attached device 150 relative to the first panel 110 may provide easier handling during the installation process. In other examples, increasing the range of motion beyond 90 degrees may permit smaller spatial footprints for the first panel and the attached device 150, improving the ease of installation of the access cover 100.

In other examples, the system may further comprise a reorienting mechanism, operable to move the device 150, when attached to the first panel 110 by the connector 130, between the first orientation and the second orientation relative to the first panel 110. For example, the connector 130 may be a sprung hinge which, absent externally applied forces to the attached device 150, reorients the device 150 from the first orientation to the second orientation. This can further improve the quality of a seal formed between the device 150 and the first panel 110. In other examples, a remotely controlled motor is operable to move the attached device 150 between the first and second orientations relative to the first panel 110. This can allow the device to be reoriented without direct, external manipulation, which can be useful if the device is located inside an aircraft structure without direct access for, for example, an engineer.

In the examples of FIGS. 1 to 3, a fastener 145 retains the overpressure protector in the second orientation relative to the first panel 110. In other examples, the fastener may instead be a latch, or a magnet, in order to retain an attached device 150 in the second orientation relative to the first panel 110. Additionally, or alternatively, a retainer may be provided to retain the attached device 150 in the first orientation relative to the first panel 110. This may restrict movement of the attached device 150 during, for example, installation of the access cover 100 in the surface 50, such as maneuvering the first panel 110 and attached device 150 through the opening 55 of the surface 50, reducing the risk of unwanted collision of the attached device 150 or first panel 110 with the aircraft.

In the examples of FIGS. 1 to 3, when the overpressure protector 150 is in the second orientation relative to the first panel 110, the spatial footprint of the first panel 110 and the attached overpressure protector 150 is too large to fit through the opening 55 of the surface 50, and so the overpressure protector 150 is able to be reoriented to the first orientation in order to fit through the opening 55 of the surface 50. However, in other examples, the spatial footprint of the first panel 110 and attached device 150 in the second orientation may not be too large to fit through the opening 55. In such examples, the spatial footprint of the first panel 110 and the attached device 150 may nevertheless be reduced in the first orientation. This may improve the ease of installation, and reduce the risk of unwanted collision of the attached device 150 or access cover 100 with the aircraft. In yet further examples, the first panel 110 and attached device 150 may not have substantially different spatial footprints in the second orientation compared with the first orientation. In such examples, the attached device 150 may not protrude from the first panel 110 by a further distance in the second orientation compared with the first orientation. Nevertheless, the first panel 110 with attached device 150 may be more suitable for maneuvering with the attached device 150 in the first orientation compared with the second orientation. For example, delicate components of the attached device 150 may be shielded from accidental impact during maneuvering when the attached device 150 is in the first orientation compared with the second orientation. Additionally, or alternatively, the attached device 150 being movably attached and reorientable may permit the attached device 150 to be inspected from different angles during maintenance checks while still remaining attached to the first panel 110.

Figure 4:
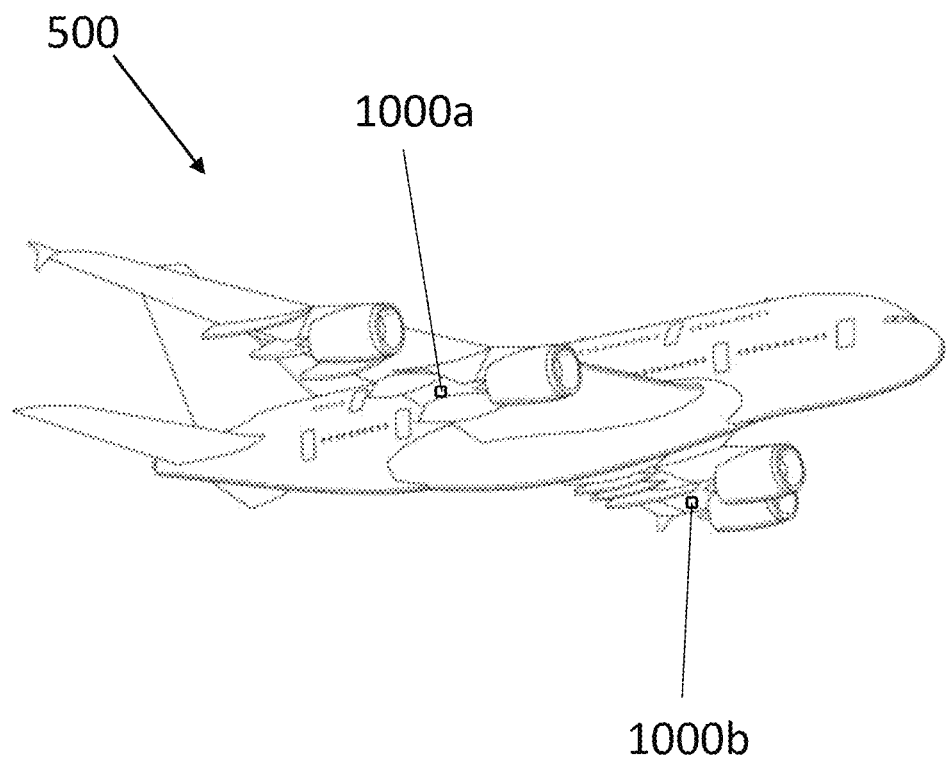
FIG. 4 shows a schematic perspective view of an aircraft comprising aircraft access covers according to embodiments of the disclosure herein.

FIG. 4 illustrates an aircraft 500 comprising access covers 1000a, 1000b according to embodiments of the disclosure herein. The access covers 1000a, 1000b are located in respective wing structures of the aircraft 500, specifically interfacing with respective fuel tanks (not visible) within the wing structures of the aircraft 500. The access covers 1000a, 1000b have respective overpressure protectors (not shown) connected thereto to release excess pressure from the fuel tanks into the external environment. The access covers 1000a, 1000b, clamping the surface of the wing structures as described previously, do not require direct, bolted attachment to the wing structures, and so the wing structures do not require reinforcement. The wing structures of the aircraft 500 are therefore lighter, which can improve fuel efficiency of the aircraft. During routine maintenance checks on the aircraft 500, ease of removal and reinstallation of the access panels 1000a, 1000b is improved, as explained previously, which can reduce service downtime of the aircraft.

Figure 5:
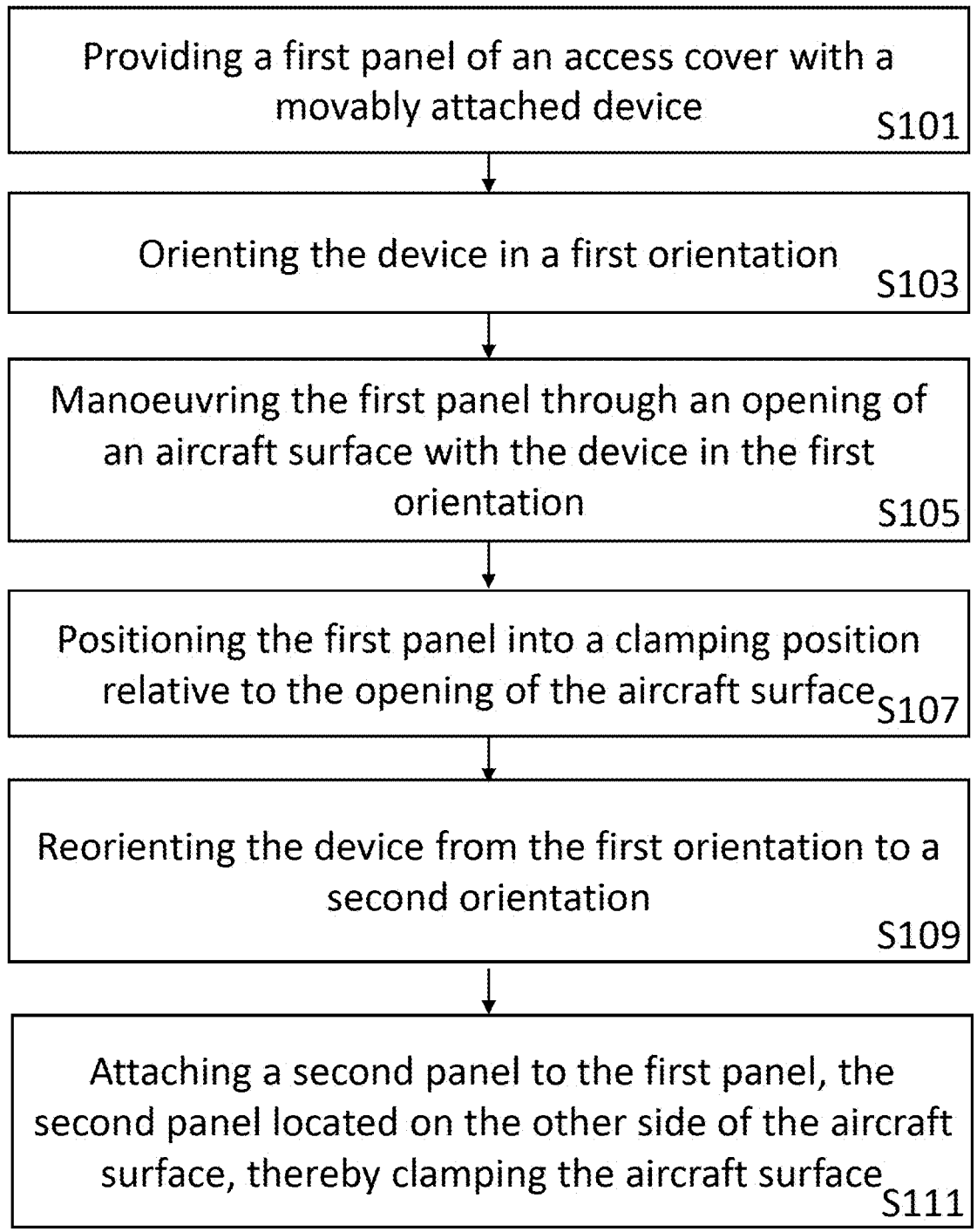
FIG. 5 shows a flowchart, detailing a process for installation of an aircraft access cover according to examples described herein.

FIG. 5 is a flowchart depicting a process for assembling an aircraft system comprising the access cover and movably attached device of previously described examples.

At block S101, a first panel of an access cover with a movably attached device is provided. This block may comprise attaching the device to the first panel of the access cover, wherein a connector permitting a movable attachment may be mounted primarily on the device, or on the first panel of the access cover, or portions of such a connector distributed between the device and the access cover.

At block S103, the device is oriented in the first orientation, the first orientation being relative to the first panel of the access cover. This block may comprise using a retainer to retain the attached device in the first orientation. In some examples, the device is already attached in the first orientation at block S101, in which case block S103 may not be required.

At block S105, the first panel and attached device are maneuvered through an opening of an aircraft surface with the device in the first orientation.

At block S107, the first panel and attached device are positioned into a clamping position relative to the opening of the aircraft surface. The clamping position is the position in which the first panel can be attached to a second panel and thereby clamp the aircraft surface between the panels. This block may involve rotation of the first panel and the attached device relative to the position of the first panel as the first panel and the attached device are maneuvered through the opening of the aircraft surface.

At block S109, the attached device is reoriented from the first orientation relative to the first panel 110 to a second orientation relative to the first panel 110. The device may be operable in the second orientation.

At block S111, a second panel is attached to the first panel, the second panel located on the other side of the aircraft surface to thereby clamp the aircraft surface between the first panel and the second panel.

In other examples, block S109 and block S107 are swapped in order, and in further examples occur concurrently, as positioning the first panel of the access cover into a clamping position may occur independently from reorienting the device relative to the first panel 110. Similarly, block S111, which occurs after block S107, may occur before block S109, as securing the first and second panel of the access cover may occur independently from reorienting the device.

Figure 6:
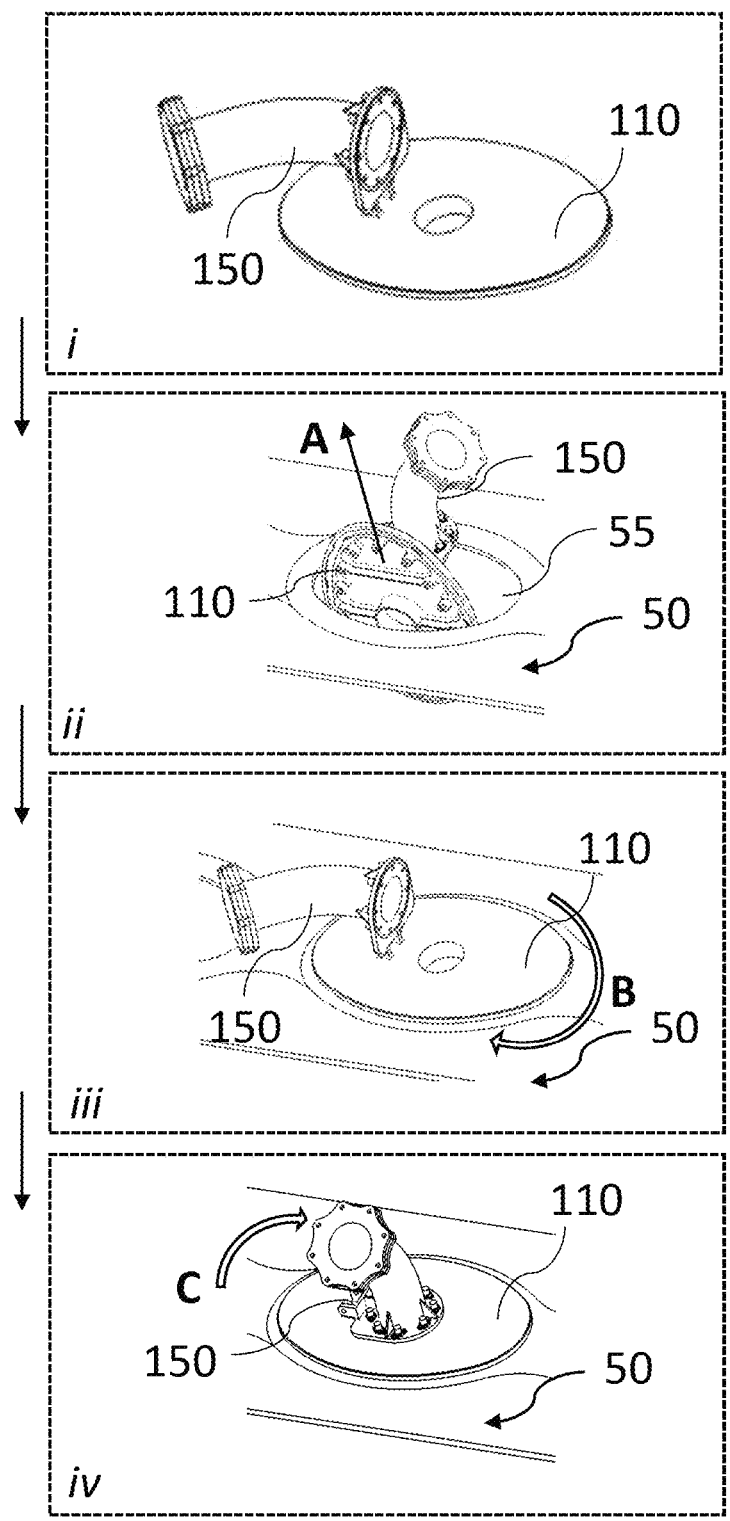
FIG. 6 shows a flowchart of schematic diagrams, illustrating a process for installation of the aircraft access cover according to FIGS. 1 to 3.

FIG. 6 illustrates a flowchart of schematic diagrams, indicating the blocks of FIG. 5 in the context of the embodiment presented in FIGS. 1-3.

Frame i of FIG. 6 illustrates the first panel 110 of the access cover 100 with the overpressure protector 150 attached to the first panel 110 by the connector 130 and positioned in the first orientation.

Frame ii of FIG. 6 illustrates the first panel 110 of the access cover 100 with the overpressure protector 150 attached to the first panel 110 by the connector 130 and positioned in the first orientation being maneuvered, indicated by directional arrow A, through the opening 55 of the aircraft surface 50.

Frame iii of FIG. 6 illustrates the first panel 110 of the access cover 100 being positioned into a clamping position by a rotation indicated by directional arrow B such that the opening 55 is blocked, having been first aligned parallel with the aircraft surface 50.

Frame iv of FIG. 6 illustrates the overpressure protector 150 being reoriented from the first position relative to the first panel 110 to the second orientation relative to the first panel 110, see directional arrow C.

The second panel 120 (not shown) may be attached to the first panel 110 to thereby clamp the surface 50 once the first panel 110 is in a clamping position.

It is to be understood that any feature described in relation to any one embodiment may be used alone, or in combination with other features described, and may also be used in combination with one or more features of any other of the embodiments, or any combination of any other embodiments. Furthermore, equivalents and modifications not described above may also be employed without departing from the scope of the disclosure herein, which is defined in the accompanying claims.

It is to be noted that the term "or" as used herein is to be interpreted to mean "and/or", unless expressly stated otherwise.

It should be understood that modifications, substitutions and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft access cover for blocking an opening in a surface of an aircraft, the aircraft access cover comprising:
    a first panel that comprises a connector, the connector comprising a hinge for attaching a device to the first panel, such that the device, when attached to the first panel by the hinge, is movable between a first orientation relative to the first panel and a second orientation relative to the first panel; and
    a second panel;
    wherein the first panel and the second panel are attachable to one another, such that the surface of the aircraft is clampable between the first panel and the second panel when the first panel and the second panel are attached to each other.

2. The aircraft access cover according to claim 1, wherein the aircraft access cover comprises a retainer configured such that the device, when attached to the first panel by the hinge, is retainable by the retainer in at least one of the first orientation and the second orientation.

3. The aircraft access cover according to claim 2, wherein the retainer comprises one or more of a latch, a fastener, and a magnet.

4. The aircraft access cover according to claim 1, wherein the first panel comprises an aperture, the aperture aligned to interface with the device when the device is attached.

5. The aircraft access cover according to claim 1, wherein the hinge comprises a sprung hinge or a motor operable to move the device, when attached to the first panel by the hinge, between the first orientation and the second orientation.

6. The aircraft access cover according to claim 1, wherein the device comprises at least one of an overpressure protector and a magnetic level sensor.

7. An aircraft system, comprising:
an aircraft access cover for blocking an opening in a surface of an aircraft, the aircraft access cover comprising:
a first panel; and
a second panel;
wherein the first panel and the second panel are attachable to one another, such that the surface of the aircraft is clampable between the first panel and the second panel when the first panel and the second panel are attached to each other;
a device that is operable to perform a function while attached to the aircraft access cover; and
a hinge, by which the device and the first panel are configured for movable attachment to one another, such that, when the device and the first panel are attached to each other by the hinge, the device is movable between a first orientation relative to the first panel and a second orientation relative to the first panel.

8. The aircraft system according to claim 7, wherein the device, when attached to the first panel of the aircraft access cover:
protrudes from the aircraft access cover by a first distance when in the first orientation relative to the aircraft access cover; and
protrudes from the aircraft access cover by a second distance when in the second orientation relative to the aircraft access cover,
wherein the first distance is less than the second distance.

9. The aircraft system according to claim 7, wherein the first panel comprises an aperture and the device interfaces with the aperture when the device is attached to the first panel and in the second orientation relative to the first panel.

10. The aircraft system according to claim 9, wherein at least one of the device and the first panel comprises a seal positioned between the device and the first panel when the device is in the second orientation, thereby to seal a path fluidically connecting the device and the aperture.

11. The aircraft system according to claim 9, wherein the device comprises an overpressure protector or a magnetic level sensor.

12. The aircraft system according to claim 7, comprising a retainer, the retainer configured such that the device, when attached to the first panel by the hinge, is retainable by the retainer in at least one of the first orientation and the second orientation.

13. The aircraft system according to claim 7, comprising the surface of the aircraft.

14. The aircraft system according to claim 7, wherein:
the aircraft access cover and the device are maneuverable through the opening of the surface of the aircraft when the device is attached to the aircraft access cover and in the first orientation relative to the aircraft access cover; and
the aircraft access cover and the device are not maneuverable through the opening of the surface when the device is attached to the aircraft access cover and in the second orientation relative to the aircraft access cover.

15. An aircraft comprising the aircraft system according to claim 7.

16. A method of assembling an aircraft system, the method comprising:
providing a first panel of an access cover, the first panel having a device attached thereto by a hinge, wherein the device is arranged by the hinge in a first orientation relative to the first panel;
maneuvering the first panel, with the device attached thereto by the hinge and oriented in the first orientation, through an opening in a surface of an aircraft;
positioning the first panel with the device attached thereto by the hinge into a clamping position relative to the opening of the surface of the aircraft;
using the hinge, while the first panel is in the clamping position, to reorient the device from the first orientation to a second orientation relative to the first panel; and
attaching the first panel to a second panel, thereby clamping the surface of the aircraft between the first and second panels.

* * * * *